April 22, 1958  L. E. WINTERS  2,831,911

WELDER CABLE TERMINAL

Filed Sept. 21, 1953

Lester E. Winters
INVENTOR.

BY *Clarence A. O'Brien*
*and Harvey B. Jacobson*
Attorneys

United States Patent Office 2,831,911
Patented Apr. 22, 1958

2,831,911

WELDER CABLE TERMINAL

Lester E. Winters, Detroit, Mich.

Application September 21, 1953, Serial No. 381,219

2 Claims. (Cl. 174—15)

The present invention relates, generally speaking, to resistance welding equipment and has more particular reference to an improved cable terminal, said terminal being of high conductivity copper, in the form of a casting and soldered to a copper cable consisting, usually, of a single, stranded copper or equivalent wire.

Cables in the stated category are used, as is obvious, to conduct electricity from the usual transformer to welding equipment, for instance, welding guns, hydramatics, pedestal welders, fixtures and so on and so forth. The object of this invention is to simplify welding cable assembly arrangements affording operative association between the transformer and the stated welding equipment and to appreciably improve upon the relatively complicated cable terminals currently in use.

Also in the general category of accomplishments, it is a further object of the invention to improve upon and reduce the number of parts entering into the combination, thereby not only increasing the efficiency of the structure as a whole, but also rendering the same less costly to manufacture and otherwise simplifying factors of assembling and sale.

Another object of the invention has to do with a terminal which is of the utmost simplicity from the standpoint of designing and construction and which, because of its simple characteristics, will meet the respective requirements of manufacturers and needs of users with requisite effectiveness.

Another object of the invention has to do with a terminal with novel passage means therein, wherein a tubular nozzle is aligned with one passage, said nozzle being capable of replacement in case it becomes damaged.

More importantly, novelty is predicated on a terminal which is characterized by a body portion with a necklike extension on one side to accommodate the cable and having a passage for insertable and removable reception of the tubular nozzle, the body itself having a cruciform arrangement of passages and an extending lug or ear on one side which may be bolted to the welding gun or equivalent detachable equipment.

Then, too, novelty is predicated on having one of the passages, the one in line with the nozzle, internally screw-threaded to accommodate an insertable and removable screw plug which may be removed in case the nozzle becomes stopped up, whereby to permit any extraneous and foreign matter to be pushed out by way of a piece of wire which may be inserted into the clean out hole and shoved through the nozzle and into the water passage in the cable.

Other objects, features and advantages will become more readily apparent from the following description and the accompanying sheet of drawings.

In the drawings, wherein like numerals are employed to designate like parts throughout the views, and in which:

Figure 1 is an elevational view of the cable assemblage comprising two cables for example, each having a terminal at its respective ends, the terminals being expressly constructed so that they may be connected, the ones at the left in the drawing, to the transformer (not shown), and the ones at the right to the welding gun herein shown;

Figure 2:
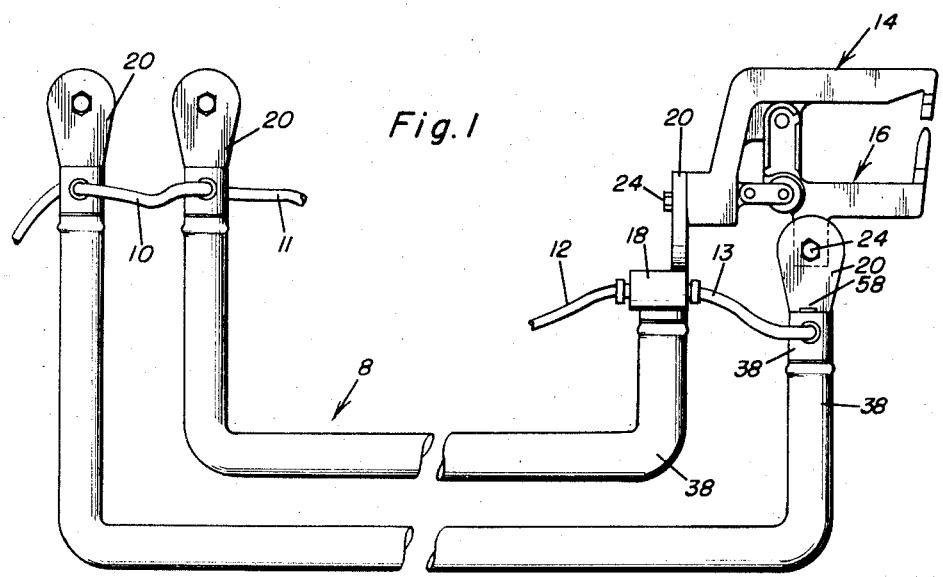
Figure 2 is an enlarged view of the terminal appearing in section and elevation and showing the cable, the clean out hole and plug and other details.
Figure 3:
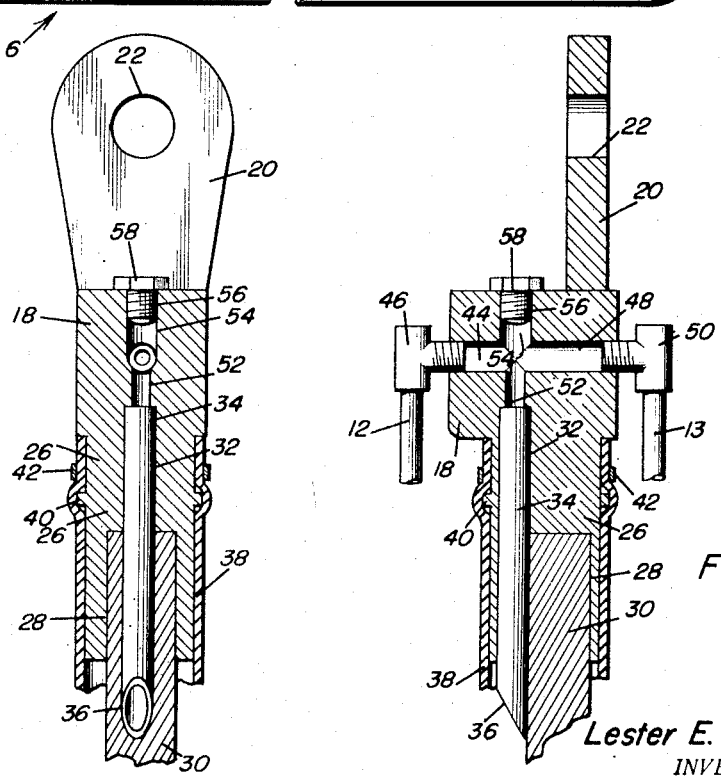
Figure 3 is a view based on Figure 1 and taken at right angles thereto and illustrating the structural details not clear from Figure 1 and 2.

There are two cables shown in Figure 1 and that which is depicted in this figure is generally referred to in the trade as the cable assembly. One cable is denoted by the numeral 6 and the other one by the numeral 8. These cables are paired and are provided with facilities whereby a coolant, such as water is circulated therethrough to control the usual excessive heating problem. The water delivery line connections are denoted generally by the numerals 10, 11, 12 and 13. The terminals at the left will be connected to a welding transformer (not shown). The ones on the right of the respective cables 6 and 8 are connected by bolting or otherwise to the welding gun, whose parts are denoted generally by the numerals 14 and 16. The novelty herein relied upon has to do, not with the so-called assembly cables, but rather with the improved terminal at the end of each cable. This terminal, as before stated, is of high conductivity copper and is cast in the shape down. It is characterized by a substantially rectangular block-like body portion which is generally denoted by the numeral 18. This is provided on one side with an outstanding ear or lug 20 having a bolt hole 22 to accommodate a bolt 24 as shown best at the right in Figure 1 for attachment to the equipment. On the other side of the body is an extension which is approximately cylindrical in cross-section and which may be herein described as an attaching stud 26. In one end, there is a suitable recess or socket 28 to accommodate the copper cable 30 which is fitted into the socket and welded or otherwise secured in place. There is a similar but longer bore defining a socket 32 into which the insertable and removable tubular nozzle 34 is fitted. The obliquely cut outer end of the nozzle is denoted at 36 and this projects beyond the extension where it communicates with a space existing between the cable 30 and the rubber tubing or so-called hose 38 which encases the cable. It will be noted that one end of the hose is fitted over the necklike stud 26 and also over a rib 40 where it is clamped in place by a clamping wire or band 42 which encircles the hose and binds the latter on the stud. The water passage means which characterizes the body is unique. Generally speaking, it may be thought of as cruciform in form. One passage at the left in Figure 3, which may be considered as the inlet is denoted at 44 and a water supply hose 12 is connected thereto by an appropriate fitting 46. The axially aligned passage which is the outlet, is denoted at 48 and the accompanying fitting 50 is joined thereto and also joined with the cooperating hose or line 13. The delivery passage in communication with the two passages 44 and 48 is denoted here by the numeral 52 and this delivers water from an inlet 44, say into the nozzle 34. Obviously, however, the water may circulate in one direction or the other, whereupon the terms "inlet" and "outlet" will of course be reversed. The remaining passage is conveniently denoted by the numeral 54 and this is screw-threaded to accommodate a screw-threaded plug 56 having an appropirate tool gripping head 58. This passage 54 and the plug forms the clean out means and permits the clean out wire or other element to be inserted and pushed through the nozzle and reciprocated or otherwise jiggled to loosen accumulated sediment or extraneous matter which might tend to clog the passages or perhaps the nozzle or the portion of the passage in the cable which immediately communicates with the nozzle.

The nozzle 34 is preferably a brass tube and as stated, it conveys water into or from the cable, all depending on which way the water is flowing. This brass tube can be replaced any time the present tube is damaged.

A copper cable is inserted in the terminal and soldered and this cable, of course, conveys the electricity to the welding equipment. The rubber hose means 38 serves as an insulator and also permits passage of water around the copper cable to prevent over-heating of the latter.

The elements 54, 56 and 58 constitute the cable clean out hole or means and by removing the plug and inserting the wire down through the tube, foreign matter may be cleaned out and blocking of the water circulation prevented.

From a maintenance standpoint, it is easier to assemble this terminal to welding equipment and to service the cable in the event that the water flowing through the cable should become plugged-up due to foreign matters getting into the water circulation. The pipe plug which is mounted directly next to the lug 20, may be removed and a piece of wire, approximately 3/16 of an inch in diameter, may be inserted in this clean out hole and shoved down inside of the cable removing the obstructions that may be there, permitting the water to flow freely. This can be done without the cable being removed from the equipment to which it is attached. None of the existing equipment has this feature in that they consist of at least two parts threaded together. The two parts must be removed in order to clean out the sediment which forms after the unit has been in operation for a short time. The simplicity of cleaning this terminal cable is one of its important features. This terminal may be used many times over by unsoldering the cable which may have been burned-out or may have been damaged in some way, manner or form while in operation.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. As a new article of manufacture, a terminal for attachment to a welding cable comprising a solid one-piece block-like body having an upstanding apertured attaching lug on its top side and a depending extension on the bottom side, said extension being cylindrical in cross-section and adapted to be fixedly joined with a cable and having an axial socket for reception and retention of said cable, said body having a lengthwise vertical bore providing a passage extending therethrough from the top side to the bottom side and on through said extension and opening into the socket in said extension, the upper end of said passage being internally screw-threaded and providing a clean-out hole, a replaceable nozzle having one end removably fitted into said passage and the other end extending beyond said extension and on through and beyond the open end of said socket, a screw-threaded closing plug screwed into the screw-threaded upper end of said passage, and said body having a second bore providing a horizontal passage which is at right angles to the vertical passage, intersecting the latter and opening through opposite vertical sides of the body.

2. The structure defined in claim 1 and wherein said socketed extension is such that it may be telescopically fitted into an end portion of the usual rubber hose which encases said cable, the end portions of said second bore being screw-threaded to accommodate the screw-threaded water line attaching fittings, said attaching lug being offset and located to one side of the closing plug so that the latter is out of the way of the lug and readily accessible for use, and the upper end of said lug having a bolt hole well above the upper end of said plug.

References Cited in the file of this patent

UNITED STATES PATENTS

| | | |
|---|---|---|
| 1,674,829 | La Bean | June 26, 1928 |
| 2,308,673 | Burgett | Jan. 19, 1943 |
| 2,371,185 | Purat | Mar. 13, 1945 |